Nov. 1, 1932.                W. B. DRURY                    1,885,594
                       ANTIGLARE MIRROR ATTACHMENT
                          Filed Dec. 19, 1929
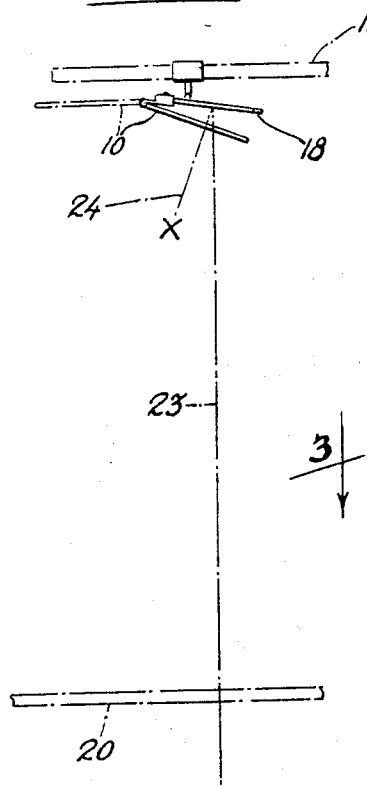
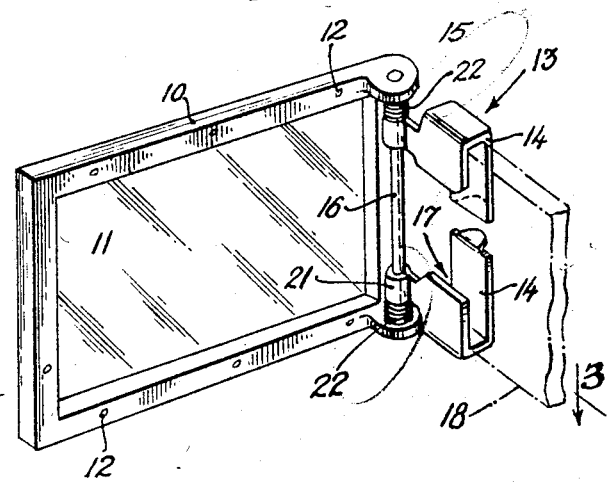
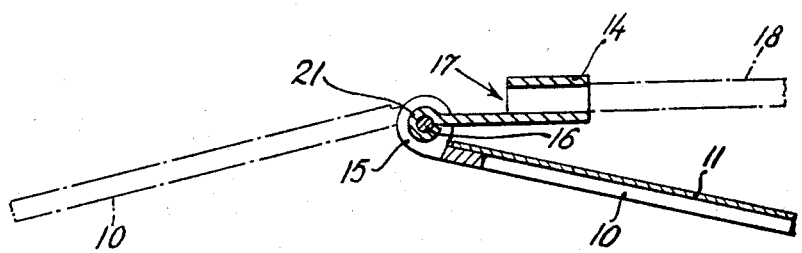
WENDELL B. DRURY,
INVENTOR
BY Victor J. Evans,
ATTORNEY.

Patented Nov. 1, 1932

1,885,594

UNITED STATES PATENT OFFICE

WENDELL B. DRURY, OF STAMFORD, CONNECTICUT

ANTIGLARE MIRROR ATTACHMENT

Application filed December 19, 1929. Serial No. 415,277.

This invention relates to anti-glare mirror attachments for controlling light rays.

The invention is primarily concerned with rear-view mirrors of vehicles and has for one of its objects the provision of a translucent member for intercepting the resultant reflection of rays of light along the forward line of sight of the driver of a vehicle, following the projection of the rays from the headlights of vehicles in rear to the rear-view mirror of a front vehicle, to obviate the inconvenience and accompanying risk caused to the front driver by such reflection of rays.

As rear-view mirrors are used under all light conditions, while the anti-glare shield may only be required under certain light conditions, another object of the invention is the provision of a removable shield which may be easily attached to the mirror of a car when the headlights are in operation, and which, when not required for use, may be removed from the mirror without the use of tools, and with a minimum of manipulation.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawing, which latter shows embodiments of the invention as at present preferred.

In the said drawing:

Figure 1 is a top plan view of my improved anti-glare device, shown in connection with part of the structure of an automobile.

Figure 2 is an enlarged perspective view of the device.

Figure 3 is a horizontal sectional view on the line 3—3 of Figure 2.

In the particular embodiment of the invention selected for illustration in the drawing, the numeral 10 designates a metal frame which, having a translucent or partly transparent sheet 11 of celluloid or the like material attached thereto by removable fastening elements 12, is swingably carried by a compound bracket 13, which includes a pair of like members 14.

The frame 10 has attached to or formed therewith a pair of apertured ears 15, which receive the terminals of a rod 16. Each of the members 14 is provided with a pair of flanges, between which a space 17, of any required dimension, accommodates the opposite edges of the usual rear-view mirror 18 of an automobile or like vehicle, the respective wind shield and rear window of which are represented at 19 and 20.

The members 14 are also provided with knuckles 21, which are slidable on the rod 16, and, in order to removably hold the compound bracket engaged to the mirror, a pair of coil springs 22 are disposed between the said knuckles and the ears 15. While these springs exert a pressure against the knuckles, for the purpose just stated, the said springs are also effective to urge the ears 15 with a like pressure, whereby the frame 10 is resiliently held in a selected position, this position being variable on manipulation of the frame.

In Figure 1 the mirror 18 is positioned slightly laterally of the direct line of vision of the driver, one angle of reflected rays of light, projected as at 23, through the rear window 20, being represented at 24 between the eye X of the driver and the mirror. The frame 10 and its shield 11 are shown in one position in full lines, in the said figure, between the mirror and the eye of the driver, and in another position in dot-and-dash lines.

The members of the bracket 13 of the attachment which, when not in use, may be detached and kept as part of the usual equipment of the car, are herein shown in connection with a mirror having parallel edges, but other forms of brackets, to suit other shapes of mirrors, may be manufactured.

The hereinbefore described construction admits of considerable modification without departing from the invention; therefore, it is desired not to be limited to the precise arrangements shown and described, which are as aforesaid, by way of illustration merely. In other words, the scope of protection contemplated is to be taken solely from the appended claim, interpreted as broadly as is consistent with the prior art.

What is claimed as new, is:

In an anti-glare device for quick detachable engagement with a rear view mirror in a motor vehicle, such mirror of the type having substantially straight and parallel edge portions at top and bottom, the combination of a pane of transparent material of a light-dimming character, a frame in which said pane is set, hinge means on one end of said frame and including a vertical hinge pin offset laterally from the plane of said frame, a pair of fitments rotatable on said pin and slidable toward and away from each other along said pin, the upper fitment having near its free end a clip portion defining substantially an inverted U in cross-section and the lower fitment having near its free end a clip portion defining substantially a U in cross-section, said clip portions being shaped one for clasping the top, back and front of the upper edge portion of said mirror and the other for clasping the bottom, back and front of the lower edge portion of said mirror, and spring means urging said clip portions toward each other along said pin.

In testimony whereof I hereby affix my signature.

WENDELL B. DRURY.